(12) United States Patent
Na

(10) Patent No.: US 6,366,957 B1
(45) Date of Patent: Apr. 2, 2002

(54) COMPUTER SYSTEM HAVING REMOTE WAKE-UP FUNCTION AND REMOTE WAKE-UP METHOD THEREOF

(75) Inventor: Seung-Ju Na, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/262,739

(22) Filed: Mar. 5, 1999

(30) Foreign Application Priority Data

Mar. 5, 1998 (KR) ............................................. 98-7318

(51) Int. Cl.⁷ .......................... G06F 15/16; G06F 11/30
(52) U.S. Cl. ....................................... 709/229; 713/202
(58) Field of Search ................................ 709/229, 217, 709/222, 225; 713/2, 202, 180

(56) References Cited

U.S. PATENT DOCUMENTS

| | | |
|---|---|---|
| 5,421,009 A | 5/1995 | Platt |
| 5,577,209 A | 11/1996 | Boyle et al. |
| 5,802,305 A | 9/1998 | McKaughan et al. |
| 5,826,015 A | 10/1998 | Schmidt |
| 5,828,833 A | 10/1998 | Belville et al. |
| 5,864,683 A | 1/1999 | Boebert et al. |
| 5,974,547 A * | 10/1999 | Klimento ........................ 713/2 |
| 6,101,608 A * | 8/2000 | Schmidt et al. ............. 713/202 |
| 6,119,228 A * | 9/2000 | Agelo et al. ................. 713/180 |

* cited by examiner

Primary Examiner—Glenton B. Burgess
Assistant Examiner—Kenneth W. Fields
(74) Attorney, Agent, or Firm—Robert E. Bushnell, Esq.

(57) ABSTRACT

A computer system having a remote wake-up function capable of storing confidential information, and a remote wake-up method thereof. The computer system having a remote wake-up function includes: a network information storage portion for storing network information including a network address and a password; and a magic packet controller for receiving a magic packet via a physical layer portion, comparing a network address and a password which are contained in a magic packet, with the network address and the password stored in the network information storage portion, and generating a wake-up control signal to transfer to a power management unit of the computer system only when the compared network addresses and passwords are the same each other, wherein the computer system suspended is booted by the wake-up control signal. Therefore, when waking up remotely the computer system via a network, it is determined whether or not such remote waking up is by an authorized supervisor system. As a result, the computer system can be prevented from having information stolen therefrom by a user with bad intentions. Also, as a further result, the computer system can avoid becoming damaged by a user with bad intentions.

21 Claims, 7 Drawing Sheets

COMPUTER SYSTEM HAVING REMOTE WAKE-UP FUNCTION AND REMOTE WAKE-UP METHOD THEREOF

CLAIM OF PRIORITY

This application makes reference to, incorporates the same herein, and claims all benefits accruing under 35 U.S.C. § 119 from an application entitled COMPUTER SYSTEM HAVING THE FUNCTION OF EMOTE WAKING UP AND METHOD FOR REMOTE WANG UP THE COMPUTER SYSTEM earlier filed in the Korean Industrial Property Office on the 5th day of March 1998, and there duly assigned Ser. No. 98-7318, a copy of which is annexed hereto.

BACKGROUND OF THE INVENTION

1. Technical Field

The present invention relates to a computer system, and more particularly to a computer system having a remote wake-up function and to a remote wake-up method of the computer system.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette s drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a portable computer such as a notebook computer or palm-sized computer, or other type of computer.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

One example of non-volatile memory is read only memory (ROM). Information stored in non-volatile memory can remain unchanged even when there is a power failure. The information stored in non-volatile memory will stay there until it is changed. Read only memory is used to store important information such as instructions for the central processing unit. There are different types s of read only memory including electrically-erasable-programmable-read-only-memory (EEPROM) chip and flash-read-only-memory (flash-ROM). The flash-ROM can also be referred to as flash memory.

Computer systems include a basic input output system (BIOS) which is an especially important program stored in read only memory. The basic input output system tests a computer every time the computer is powered on. The basic input output system can allocate a computer system's resources automatically, making adjustments needed to accommodate new hardware. Also, the basic input output system governs how system board components interact.

When the computer system is powered on, the basic input output system immediately takes control of the computer system and its components. The first duty of the basic input output system is to perform a series of diagnostic routines called the power on self test (POST) routine, which ensures that every part of the computer system's hardware is functioning properly. An operating system is a group of functions that are used for operating the computer system after the power on self test routine is performed. Microsoft Windows 98 is one example of an operating system.

A plurality of computer systems can be connected by a network. One or more of the plurality of computer systems connected by the network can be a supervisory computer system. Each one of the computer systems can include software programs. An operator can use the supervisory computer system to update the software programs of the other computer systems connected to the network. The update performed by the operator can be performed using the network itself.

I have discovered that a user with bad intentions may utilize a computer network to read confidential information stored in another computer connected to the network and also damage another computer system connected to the network. Efforts have been made to improve computers interconnected on networks and to improve the networks themselves.

Exemplars of recent efforts in the art include U.S. Pat. No. 5,864,683 for SYSTEM FOR PROVIDING SECURE INTERNETWORK BY CONNECTING TYPE ENFORCING SECURE COMPUTERS TO EXTERNAL NETWORK FOR LIMITING ACCESS TO DATA BASED ON USER AND PROCESS ACCESS RIGHTS issued to Boebert et al., U.S. Pat. No. 5,828,833 for METHOD AND SYSTEM FOR ALLOWING REMOTE PROCEDURE CALLS THROUGH A NETWORK FIREWALL issued to Belville et al., U.S. Pat. No. 5,826,015 for METHOD AND APPARATUS FOR SECURE REMOTE PROGRAMMING OF FIRMWARE AND CONFIGURATIONS OF FIRMWARE AND CONFIGURATIONS OF A COMPUTER OVER A NETWORK issued to Schmidt, U.S. Pat. No. 5,802,305 for SYSTEM FOR REMOTELY WAKING A SLEEPING COMPUTER IN POWER DOWN STATE BY COMPARING INCOMING PACKET TO THE LIST OF PACKETS STORING ON NETWORK INTERFACE CARK issued to McKaughan et al., U.S. Pat. No. 5,5777,209 for APPARATUS AND METHOD FOR PROVIDING MULTI-LEVEL SECURITY FOR COMMUNICATION AMONG COMPUTERS AND TERMINALS ON A NETWORK issued to Boyle et al., and U.S. Pat. No. 5,421,009 for METHOD OF REMOTELY INSTALLING SOFTWARE DIRECTLY FROM A CENTRAL COMPUTER issued to Platt.

While these recent efforts provide advantages, I note that they fail to adequately provide a computer system having remote wake-up function and remote wake-up method thereof.

SUMMARY OF THE INVENTION

To solve the above problems, objectives of the present invention are to provide a computer system having a remote wake-up function, which is awoken only by a magic packet transmitted by an authorized supervisor system, and to provide a remote wake-up method thereof.

According to an aspect of the objectives of the present invention, there is provided a computer system connected to a network having a remote wake-up function, comprising a network connection portion including a transformer, a physical layer portion and a network controller, wherein the network connection portion further comprises: a network information storage portion for storing network information including a network address and a password; and a magic packet controller for receiving a magic packet via the physical layer portion, comparing a network address and a password which are contained in the magic packet, with the network address and the password stored in the network information storage portion, and generating a wake-up control signal to transfer to a power management unit of the computer system only when the compared network addresses and passwords are the same each other, and the computer system suspended is booted by the wake-up control signal.

According to another aspect of the objective of the present invention, there is provided a method for remotely waking up a computer system connected to a network, comprising the steps of: (a) receiving a magic packet via the network; (b) identifying a network address contained in the magic packet; (c) identifying a password contained in the magic packet; (d) generating a wake-up control signal; and (e) booting the computer system by a basic input/output system (BIOS), wherein the waking-up on the computer system stops when the network address and the password are not identified in the steps (b) and (c).

Also, there is provided a method for remotely waking up a computer system connected to a network, comprising the steps of: (a) receiving a magic packet via a network; (b) identifying a network address contained in the magic packet; (c) performing a power on self test (POST) by a basic input/output system (BIOS); (d) transferring an identification request packet to a supervisor system identified based on the network address contained in the magic packet; (e) receiving an identification packet from the supervisor system; (f) identifying the identification packet; and (g) loading an operating system for operating the computer system, wherein the waking-up on the computer system stops when the network address and the identification packet are not identified in the steps (b) and (f).

To achieve these and other objects in accordance with the principles of the present invention, as embodied and broadly described, the present invention provides an apparatus, comprising: a computer system processing first data when said computer system is in a first mode corresponding to a full power mode, said computer system not processing the first data when said computer system is in a second mode not corresponding to said full power mode; a storage unit storing a first address and a first password; and a control unit being coupled to said storage unit and said computer system, said control unit receiving a packet signal including a second address and a second password, comparing said first address and said first password with said second address and said second password respectively, and generating a control signal when said first address corresponds to said second address and said first password corresponds to said second password, said computer system being booted and converted to said first mode from said second mode in response to said control signal.

To achieve these and other objects in accordance with the principles of the present invention, as embodied and broadly described, the present invention provides a method, comprising: receiving a packet signal via a network unit, said network unit being coupled to a first computer system and a second computer system; determining whether a first network address contained in said packet signal corresponds to a predetermined address; determining whether a first password contained in said packet signal corresponds to a predetermined password; generating a control signal when said first network address and said first password correspond to said predetermined address and said predetermined password respectively; and booting said first computer system by a basic input output system in response to said control signal.

To achieve these and other objects in accordance with the principles of the present invention, as embodied and broadly described, the present invention provides a method, comprising: receiving a packet signal via a network unit, said network unit being coupled to at least a first computer system; detecting whether a first network address contained in said packet signal corresponds to a predetermined address; when said first network address corresponds to said predetermined address, performing a power on self test on said first computer system by a basic input output system; transmitting an identification request signal to a second computer system, said second computer system corresponding to said first network address contained in said packet signal; receiving an identification packet signal from said second computer system in response to said identification request signal; determining whether said identification packet signal corresponds to a predetermined identification code; and when said identification packet signal corresponds to said predetermined identification code, loading an operating system for operating said first computer system.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being abroad, teaching disclosure directed to persons of skill in the appropriate arts, and not as limiting upon the present invention.

Figure 1:
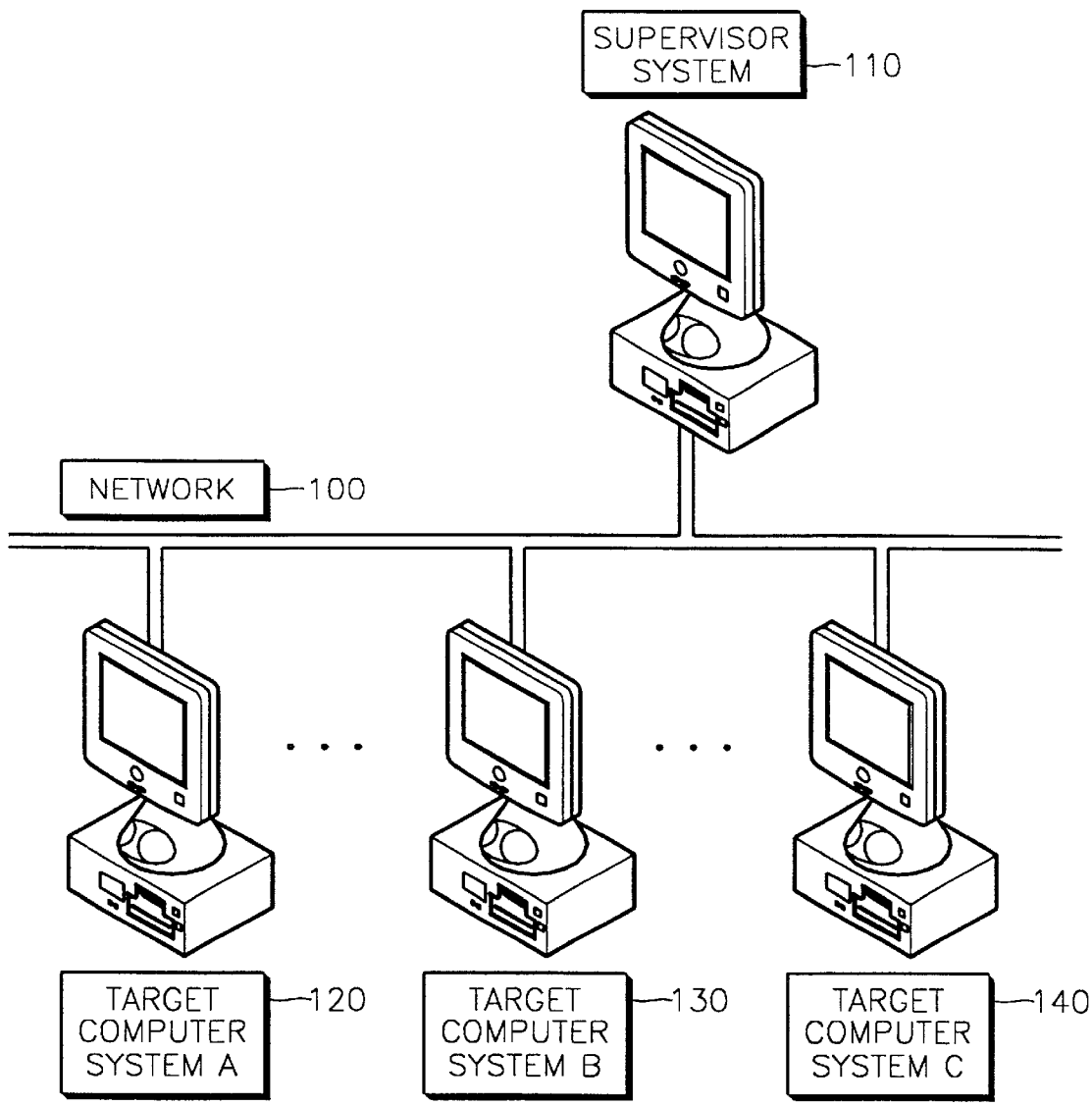
FIG. 1 is a diagram showing the structure of computer systems connected via a network.

Turn now to FIG. 1, which shows the structure of computer systems connected via a network. FIG. 1 shows a plurality of computer systems 110, 120, 130, 140 connected by a network 100. In general, when the computer systems connected to the network 100 are not in use, each computer system is suspended by a power management unit installed therein. Also, a supervisor system 110 has a need to access the computer systems connected to the network 100 in order to manage the entire computer system, or upgrade, maintain, or repair software installed in the entire computer system. First of all, the supervisor system 110 must wake up target computer systems 120, 130 and 140 which are in suspension.

Figure 2:
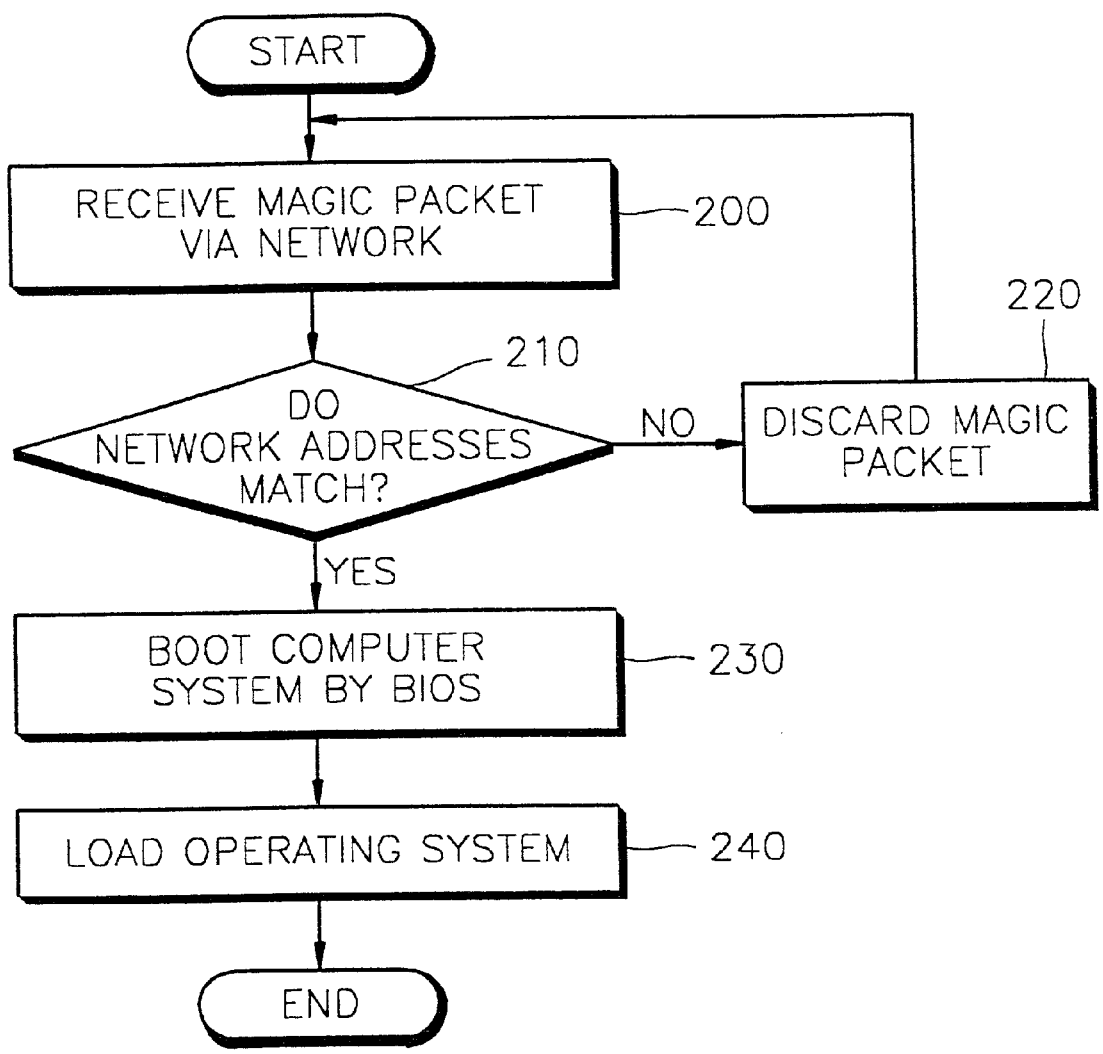
FIG. 2 is a flowchart illustrating a remote wake-up method for a computer system.

Turn now to FIG. 2, which shows a flowchart illustrating a remote wake-up method for a computer system. A method for waking up suspended computer systems by a remote supervisor system is illustrated in FIG. 2. At step 200, the supervisor system generates magic packet directing waking-up of a target computer system, and the target computer system receives the magic packet via a network.

At step 210, the target computer system generates a wake-up control signal if a network address contained in the received packet is the same as a network address of the target computer system, and transmits the wake-up control signal to a power management device installed in the target computer system. At step 220, if the compared two network addresses are different from each other, the magic packet is discarded.

At step 230, when the power management unit receives the wake-up control signal, power is supplied to a central processing unit (CPU) of the target computer system and a basic input/output system (BIOS) boots the system. At step 240, an operating system (OS) is loaded.

However, in the aforementioned method of FIG. 2, any computer system other than the supervisor system can generate a magic packet to access another computer system being suspended, so that a user with bad intentions may draw out information stored in another computer connected to his computer via a network or damage another computer system.

Figure 3:
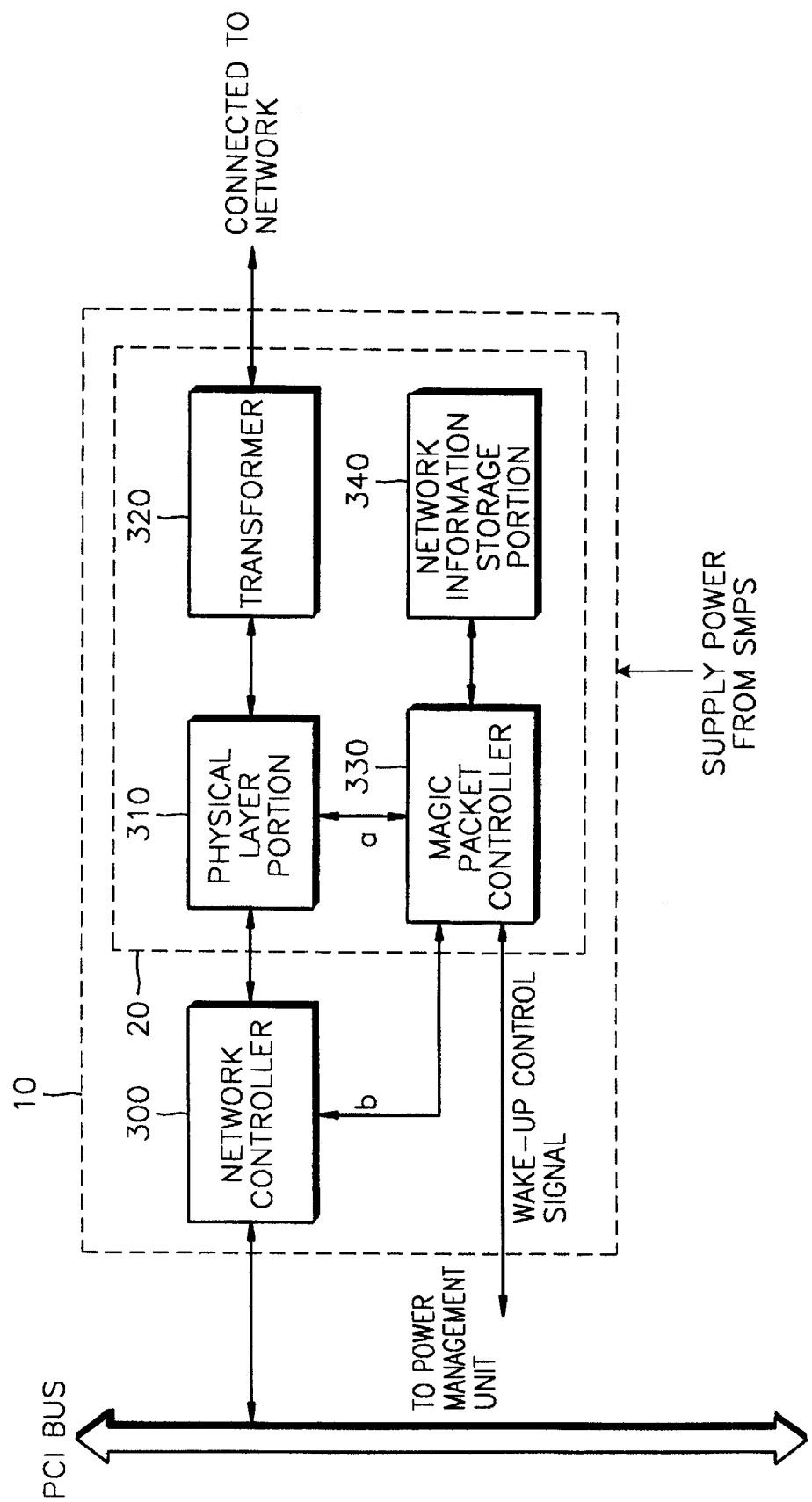
FIG. 3 is a block diagram showing the structure of a network connection portion of a computer system corresponding to a first preferred embodiment, in accordance with the principles of the present invention.

Turn now to FIG. 3, which shows a block diagram showing the structure of a network connection portion of a computer system corresponding to a first preferred embodiment, in accordance with the principles of the present invention. Referring to FIG. 3, a computer system having a remote wake-up function includes a magic packet controller 330 and a network information storage portion 340 as well as a network connection portion including a transformer 320, a physical layer portion 310 and a network controller 300. The network information storage portion 340 stores a network information including a network address and a password. Here, the network information storage portion 340 may be an electrically erasable and programmable read-only-memory (EEPROM).

The magic packet controller 330 receives a magic packet a via the physical layer portion 310, compares a network address and a password contained in the magic packet a with the network address and the password stored in the network information storage portion 340, respectively, and generates a wake-up control signal to transfer to a power management unit only when the compared addresses and passwords are the same as each other.

In FIG. 3, even when the computer system is suspended, power is supplied to elements enclosed by dashed line indicated by reference numeral 20 from a switching mode power supply (SMPS).

With reference to switching mode power supplies, a switching mode power supply (SMPS) utilizing a pulse width modulator controls power of electronic machinery by performing a line regulation on the primary side of power and a load regulation on the secondary side of power by means of a pulse width modulation controller. Generally, switching mode power supplies require a protection circuit to protect the load, or to protect components within the power supply from an overvoltage, an overcurrent, or an induced surge. A switching mode power supply performs a line regulation by sensing the current from an output signal of a switching output part controlled by a pulse width modulation controller, performs a load regulation by detecting the voltage change induced from a coil of the largest turns ratio of the secondary loads of the power, and has the voltage of the power on the secondary side compensated in order to pass the results of the line regulation and the load regulation back to the pulse width modulation controller. A switching mode power supply may include an alternating current (AC) input part, a rectifier part, a switching transformer, a switching output part, a pulse width modulation controller, a current sensing part, an output part, and an error detection and feedback part. The alternating current input part receives an alternating s current voltage from an external source. Then the alternating current input part supplies the alternating current voltage to the rectifier part, which then outputs a direct current (DC) voltage to a load on the primary side of the switching transformer. The load in this instance is a primary coil. The switching transformer inputs the direct current voltage from the rectifier part. The switching transformer then induces different predetermined voltages to loads on the secondary side, each load having different turn ratios. The switching transformer induces the different predetermined voltages to the different loads by switching according to the control signal applied from a switching output circuit in the switching output part. The loads in this instance are coils. The output part includes a plurality of outputs for the purpose of rectifying and smoothing voltages induced into the loads, and then outputs different predetermined voltages. Each output of the output part constitutes a rectifying diode and a smoothing capacitor for rectifying and smoothing voltages induced on the loads of the switching transformer. An error detection and feedback part detects an error of the highest voltage, induced on the load having the highest turns ratio, output from the output part, and feeds back the detected voltage errors to the pulse width modulation controller. A switching output circuit in the switching output part, which is composed of a switching element such as a field effect transistor (FET), controls on time and off time of the primary coil of the switching transformer by means of the pulse width modulation signal outputted from the pulse width modulation controller. A current sensing part senses an output current from the switching output circuit and supplies the sensed current to the pulse width modulation controller. One example where a tertiary side coil is utilized is as follows. The pulse width modulation controller inputs at least three signals: a voltage error detected by the error detection and feedback part, the output current of the switching output circuit sensed by the current sensing part, and a voltage induced on a tertiary coil of the switching transformer. Then the pulse width modulation controller outputs pulse width modulation signals to the switching output circuit in the switching output part with a duty cycle modulated in accordance with the three signals received by the pulse width modulation controller. The switching mode power supply senses an electric current from an output signal of a switching output part which is controlled by the pulse width modulation controller to perform the line regulation. The switching mode power supply detects a variation of voltage induced from a coil of one terminal among the loads at the secondary side of power to perform the load regulation. The results of the line regulations and load regulations are fed back to the pulse width modulation controller to thereby compensate the voltage at the secondary side of power.

With further reference to FIG. 3, when the computer system is recovered to a normal state by the wake-up control signal, the network controller 300 accesses the network information stored in the network information storage portion 340 via the magic packet controller 330 to control transmission/reception of data via the network. Also, elements enclosed by dashed line indicated by reference numeral 10 in FIG. 3 may be implemented as an extra card or on-boarded on a main board of the computer system.

Figure 4:
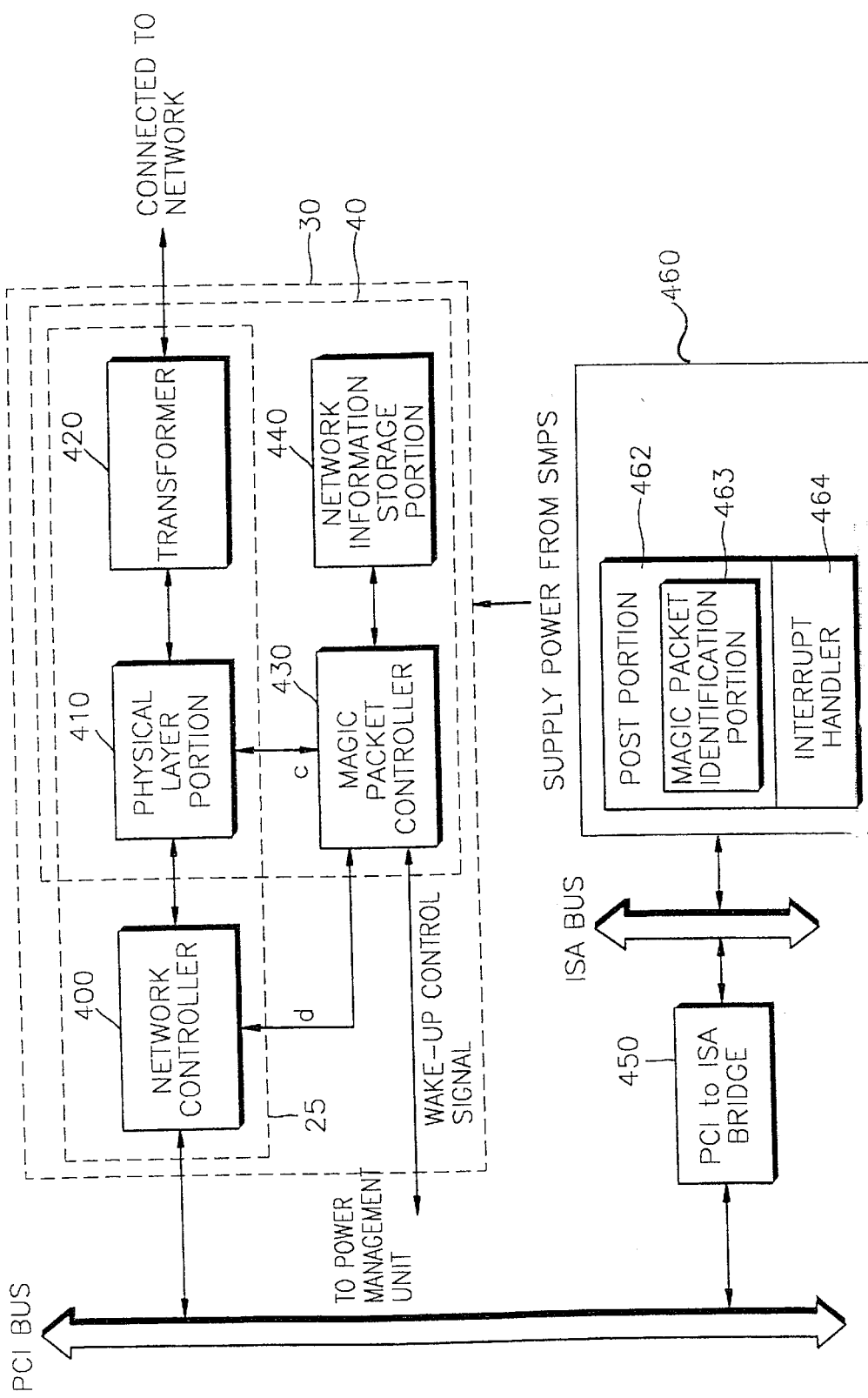
FIG. 4 is a block diagram showing the structures of a network connection portion and a basic input/output system (BIOS) of a computer system corresponding to a second preferred embodiment, in accordance with the principles of the present invention.

Turn now to FIG. 4, which shows a block diagram showing the structures of a network connection portion and a basic input/output system (BIOS) of a computer system corresponding to a second preferred embodiment, in accordance with the principles of the present invention. Referring to FIG. 4, a computer system having a remote wake-up function includes a magic packet controller 430, a network information storage portion 440 and a BIOS 460 having a magic packet identification portion 463, as well as a network connection portion 25 having a transformer 420, a physical layer portion 410 and a network controller 400.

In FIG. 4, the network information storage portion 440 stores a network information d including a network address and a password. Here, the network information storage portion 440 may be an EEPROM. The magic packet controller 430 receives a magic packet c via the physical layer portion 410, compares a network address and a password contained in the magic packet e with the network address and the password stored in the network information storage portion 440, respectively, and generates a wake-up control signal to transfer to a power management unit only when the compared addresses and passwords are the same as each other.

With reference to FIG. 4, the BIOS 460 has a power on self test (POST) portion 462 for performing a self test after power is supplied, and an interrupt handler 464 having a routine for processing interrupt. Here, the POST portion 462 has the magic packet identification portion 463 for transmitting an identification request packet to request identification of a magic packet to a supervisor system which has transmitted the magic packet, and for continuing to boot the computer system only when an identification packet has arrived from the supervisor system.

The BIOS 460 is connected to an industry standard architecture (ISA) bus, and the ISA bus connected to a Peripheral Component Interconnect (PCI) bus via a PCI-to-ISA bridge 450. In FIG. 4, even when the computer system is suspended, power is supplied to elements enclosed by dashed line indicated by reference numeral 40 from an SMPS. When the computer system is recovered to a normal state by the wake-up control signal, the network controller 400 accesses the network information d stored in the network information storage portion 440 via the magic packet controller 430 to control transmission/reception of data via the network.

Figure 5:
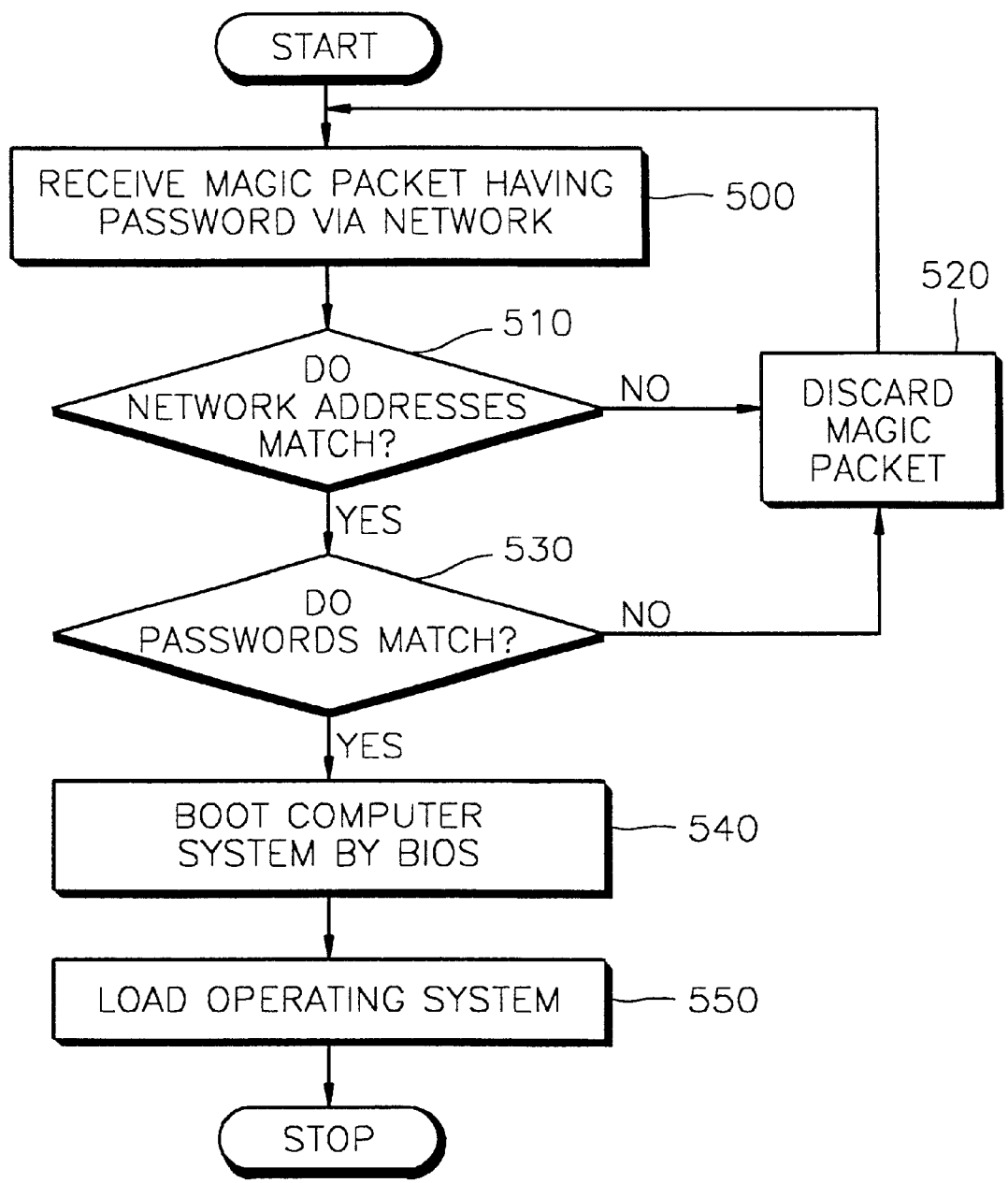
FIG. 5 is a flowchart illustrating a remote wake-up method of the computer system shown in FIG. 3, through identification of a password, corresponding to a preferred embodiment, in accordance with the principles of the present invention.

Turn now to FIG. 5, which shows a flowchart illustrating a remote wake-up method of the computer system shown in FIG. 3, through identification of a password, corresponding to a preferred embodiment, in accordance with the principles of the present invention. A method for waking up the computer system shown in FIG. 3 according to a preferred embodiment of the present invention will be described with reference to FIG. 5.

In FIG. 5, at step 500, the physical layer portion 310 receives the magic packet including the network address and the password via the network, and transfers the magic packet to the magic packet controller 300.

At steps 510 and 530, the magic packet controller 330 makes a determination as to whether or not both the network address and the password included in the magic packet are the same as those stored in the network information storage portion 340. At step 520, if the compared addresses or passwords are different from each other, the magic packet is discarded, stopping the waking-up process on the computer system.

In FIG. 5, if the compared addresses and passwords are the same as each other, the magic packet controller 330 generates the wake-up control signal and transfers the wake-up control signal to a power management unit. At step 540, the computer system is recovered to a normal state from a suspended state by the power management unit, power is supplied to a CPU, and the computer system is booted by a BIOS. At step 550, an operating system is loaded.

Figure 6:
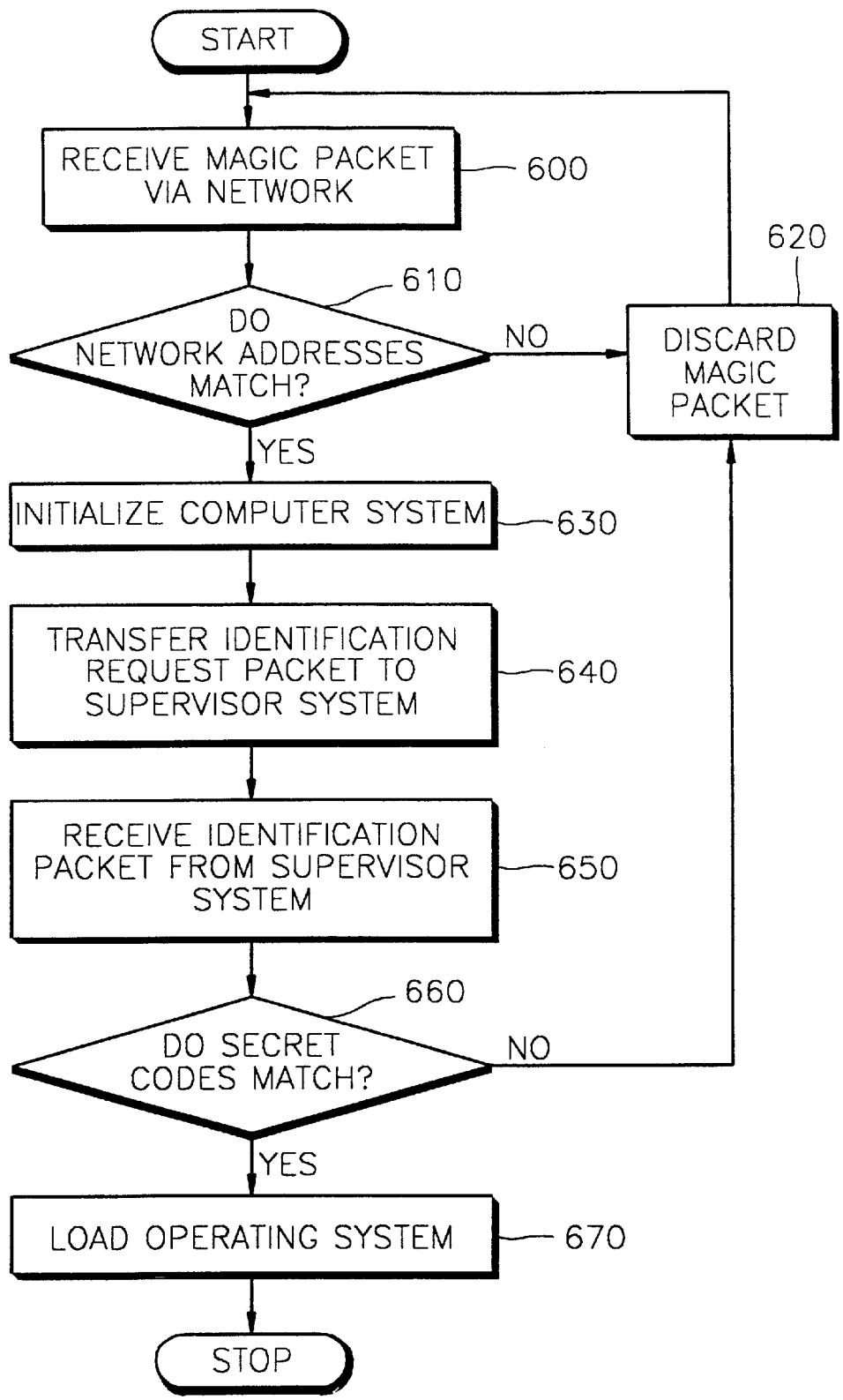
FIG. 6 is a flowchart illustrating a remote wake-up method of the computer system shown in FIG. 4, through identification of a packet, corresponding to another preferred embodiment, in accordance with the principles of the present invention.

Turn now to FIG. 6, which shows a flowchart illustrating a remote wake-up method of the computer system shown in FIG. 4, through identification of a packet, corresponding to another preferred embodiment, in accordance with the principles of the present invention. A method for waking up the computer system shown in FIG. 4 will be described with reference to FIG. 6.

FIG. 6, at step 600, the physical layer portion 410 receives the magic packet including the network address and the password via the network, and transfers the magic packet to the magic packet controller 430. At step 610, the magic packet controller 430 makes a determination of whether or not only the network address included in the magic packet is the same as that stored in the network information storage portion 440. At step 620, if the compared addresses are different from each other, the magic packet is discarded, stopping the waking-up process.

In FIG. 6, if the compared addresses are the same as each other, the magic packet controller 430 generates the wake-up control signal and transfers the wake-up control signal to a power management unit. At step 630, the computer system is recovered to a normal state from a suspended state by the power management unit and power is supplied to a CPU, so that system initialization is performed by the POST portion 462 of the BIOS 460.

In FIG. 6, at step 640, during the power on self test (POST), the magic packet identification portion 463 transfers an identification request packet to a supervisor system identified based on the address contained in the magic packet. Here, the identification request packet is transferred via the network controller 400, the physical layer portion 410, the transformer 420 and the network in sequence.

At step 650, after a predetermined time lapse, the magic packet identification portion 463 receives an identification packet from the supervisor system via the transformer 420, the physical layer portion 410 and the network controller 400 in sequence. Here, the identification request packet includes a random number set by a predetermined method, and the identification packet includes a secret code generated using the random number and a predetermined secret code generation function.

At step 660, the magic packet identification portion 463 compares the secret code of the identification packet with a secret code which is generated based on the random number and using the same secret code generation function as that of the supervisor system. At step 620, if the compared secret codes are different from each other, the magic packet is discarded, stopping the waking-up process on the computer system. At step 670, however, if the compared secret codes are the same each other, an operating system is loaded to operate the computer system. The secret codes can correspond to confidential information.

Figure 7:
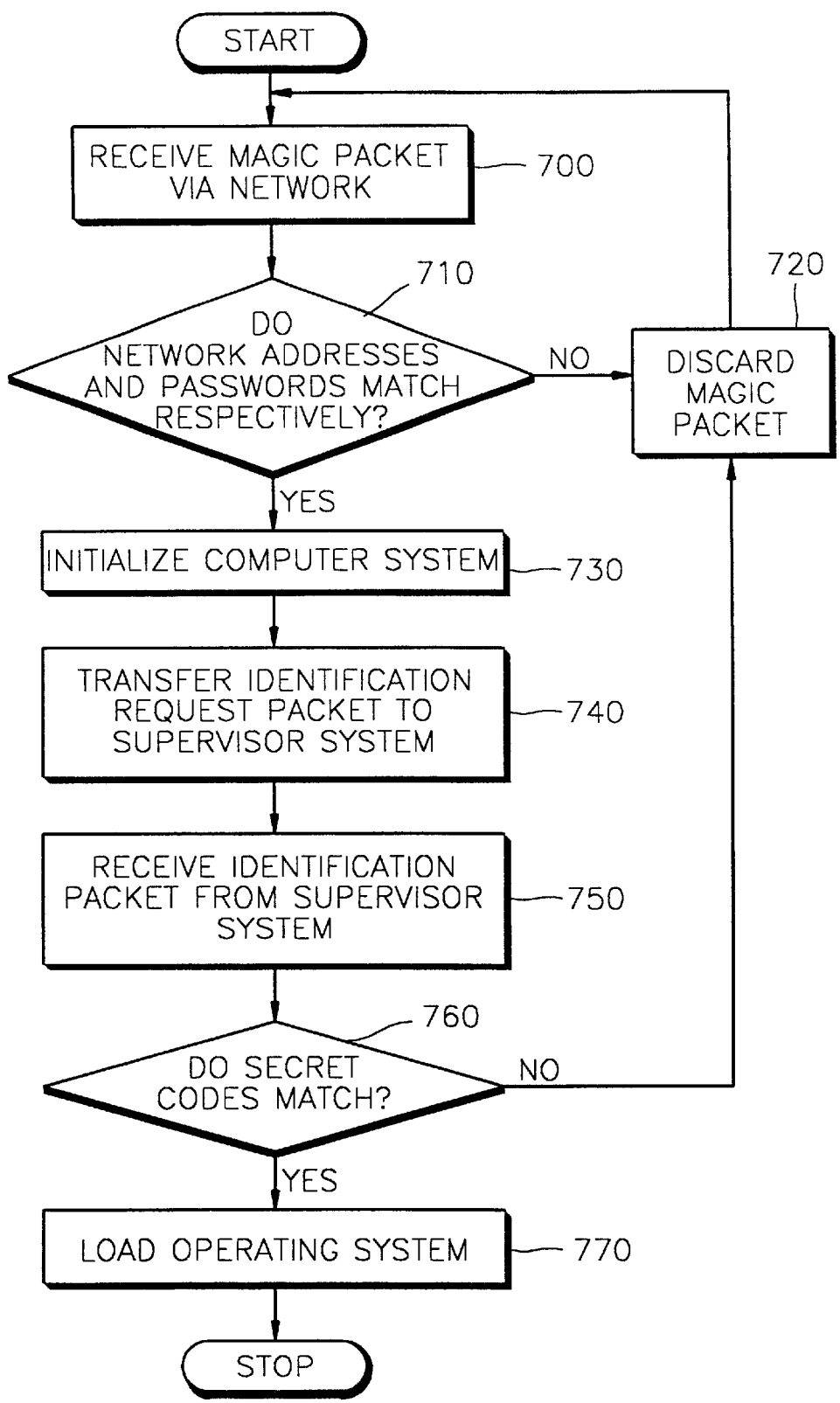
FIG. 7 is a flowchart illustrating a remote wake-up method of the computer system shown in FIG. 4, through identification of a password and a packet, corresponding to still another preferred embodiment, in accordance with the principles of the present invention.

Turn now to FIG. 7, which shows a flowchart illustrating a remote wake-up method of the computer system shown in FIG. 4, through identification of a password and a packet, corresponding to still another preferred embodiment, in accordance with the principles of the present invention. A method for waking up the computer system shown in FIG. 4 will be described with reference to FIG. 7.

FIG. 7, at step 700, the physical layer portion 410 receives the magic packet having the network address and the password via the network, and transfers the magic packet to the magic packet controller 430. At step 710, the magic packet controller 430 makes a determination of whether or not both the network address and the password included in the magic packet are the same as those stored in the network information storage portion 440.

Then, steps 720 through 770 are performed, which are the same as the steps 620 and 670 described with reference to the flowchart of FIG. 6. Thus, a determination of whether or not the supervisor system is authorized can be made through two steps: identification using the network address and the password by the magic packet controller 430, and identification based on the identification packet by the magic packet identification portion 463.

The network 100 of FIG. 1 can correspond to a standard Ethernet network, a fast Ethernet network, or any other type of network linking a plurality of computer systems together and allowing those computer systems to share files and resources.

As described above, in the computer system having a remote wake-up function and the remote wake-up method thereof according to the present invention, when waking up remotely a computer system via a network, it is determined whether or not such remote waking up is by an authorized supervisor system. As a result, the computer system can be prevented from having information stolen therefrom or damage by a user with bad intentions.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures maybe made from such details without departing from the spirit or scope of the applicant's general inventive concept.

What is claimed is:

1. An apparatus, comprising:
a computer system processing first data when said computer system is in a first power mode, said computer system not processing the first data when said computer system is in a second power mode not corresponding to said first power mode;
a storage unit storing a first address and a first password;
a control unit being coupled to said storage unit and said computer system, said control unit receiving a first packet signal including a second address and a second password, comparing said first address and said first password with said second address and said second password respectively, and generating a control signal when said first address corresponds to said second address and said first password corresponds to said second password, said computer system being initialized in response to said control signal, said computer system being converted to said first power mode from said second power mode in response to said control signal;
a supervisory computer unit transmitting said first packet signal to said control unit;
a network unit being disposed between said supervisory computer unit and said computer system, said network unit coupling said supervisory computer unit and said computer system;
a confirmation unit being coupled to said computer system and transferring an identification request signal to said supervisory computer unit in response to said first packet signal received from said supervisory computer unit, said computer system having an operating system loaded onto said computer system when a second packet signal is received from said supervisory computer unit in response to said identification request signal.

2. The apparatus of claim 1, said first address corresponding to a network address of said supervisory computer unit.

3. The apparatus of claim 2, the operating system being loaded onto said computer system when data in said second packet signal satisfies a predetermined test.

4. The apparatus of claim 3, said second packet signal satisfying said predetermined test when a code received in said second packet signal corresponds to a generated code.

5. The apparatus of claim 2, further comprising a basic input output system coupled to said computer system, said basic input output system including a power on self test portion for performing said transferring of said identification request signal.

6. The apparatus of claim 5, said power on self test portion loading the operating system onto said computer system when said second packet signal is received from said supervisory computer unit in response to said identification request signal.

7. The apparatus of claim 1, said first address corresponding to a network address of said computer system.

8. The apparatus of claim 7, the operating system being loaded onto said computer system when data in said second packet signal satisfies a predetermined test.

9. The apparatus of claim 8 said second packet signal satisfying said predetermined test when a code received in said second packet signal corresponds to a generated code.

10. The apparatus of claim 7, further comprising a basic input output system coupled to said computer system, said basic input output system including a power on self test portion for performing said transferring of said identification request signal.

11. The apparatus of claim 10, said power on self test portion loading the operating system onto said computer system when said second packet signal is received from said supervisory computer unit in response to said identification request signal.

12. The apparatus of claim 11, said computer system receiving a first power when said computer system is in said first power mode, said computer system receiving a second power when said computer system is in said second power mode, said first power being more than said second power.

13. The apparatus of claim 11, further comprising a power unit supplying a low level of power to said computer system when said computer system corresponds to said second power mode, and supplying a high level of power to said computer system when said computer system corresponds to said first power mode, said high level of power corresponding to more power than said low level of power.

14. The apparatus of claim 11, further comprising a power unit not supplying power to said computer system when said computer system corresponds to said second power mode, and supplying power to said computer system when said computer system corresponds to said first power mode, said storage unit corresponding to one electrically erasable programmable read only memory.

15. A method, comprising:
supplying a first level of power to a first computer system;
receiving a first packet signal via a network unit, said network unit being coupled to at least said first computer system and a second computer system;
detecting whether a first network address contained in said first packet signal corresponds to a predetermined address;
detecting whether a first password contained in said first packet signal corresponds to a predetermined password;
when said first network address corresponds to said predetermined address and said first password corresponds to said predetermined password, supplying a second level of power to said first computer system and initializing said first computer system and not loading an operating system for operating said first computer system, said second level of power being higher than said first level of power;
when said first network address corresponds to said predetermined address and said first password corresponds to said predetermined password, transmitting an identification request signal to said second computer system from a power on self test portion of a basic input output system of said first computer system;
receiving an identification packet signal in response to said identification request signal;
determining whether said identification packet signal corresponds to a predetermined identification code; and
when said identification packet signal does correspond to said predetermined identification code, loading the operating system for operating said first computer system.

16. The method of claim 15, said initializing of said first computer system corresponding to performing a power on self test procedure on said first computer system by said basic input output system.

17. The method of claim 15, said first network address corresponding to said second computer system.

18. The method of claim 15, said first network address corresponding to said first computer system.

19. The method of claim 15, said second computer system corresponding to a supervisory computer system.

20. The method of claim 15, said identification packet signal corresponding to said predetermined identification code when said identification packet signal is received from said second computer system.

21. The method of claim 15, said identification request signal including a random number, said identification packet signal including a secret code, said secret code being generated based on said random number and being generated by a predetermined secret code generation function.

* * * * *